United States Patent [19]

Schaeff

[11] 4,299,530
[45] Nov. 10, 1981

[54] VEHICLE WITH ADJUSTABLE BALANCE WEIGHT

[75] Inventor: Hans Schaeff, Langenburg, Fed. Rep. of Germany

[73] Assignee: Karl Schaeff GmbH & Co., Langenburg, Fed. Rep. of Germany

[21] Appl. No.: 104,405

[22] Filed: Dec. 17, 1979

[30] Foreign Application Priority Data

Dec. 16, 1978 [DE] Fed. Rep. of Germany ....... 2854526

[51] Int. Cl.³ .............................................. E02F 9/18
[52] U.S. Cl. .................................... 414/719; 414/673; 212/198; 280/758; 172/611
[58] Field of Search ............... 414/673, 719; 212/198; 280/258; 172/611

[56] References Cited

U.S. PATENT DOCUMENTS

| 496,428 | 5/1893 | Morgan | 212/198 |
|---|---|---|---|
| 2,276,713 | 3/1942 | Bramble | 280/758 X |
| 2,763,385 | 9/1956 | Harrison | 414/719 |
| 2,986,407 | 5/1961 | Krueger | 212/198 X |
| 3,497,095 | 2/1970 | Couberly | 414/719 X |
| 3,795,330 | 3/1974 | Jorgensen et al. | 414/719 |
| 4,032,016 | 6/1977 | Gräf | 414/719 X |
| 4,151,921 | 5/1979 | Myers et al. | 414/719 |
| 4,221,530 | 9/1980 | Williams et al. | 414/673 |

FOREIGN PATENT DOCUMENTS

| 829725 | 7/1938 | France | 172/611 |
|---|---|---|---|
| 52-25362 | 2/1977 | Japan | 414/673 |

*Primary Examiner*—Trygve M. Blix
*Assistant Examiner*—Terrance L. Siemens
*Attorney, Agent, or Firm*—Shlesinger, Arkwright, Garvey & Dinsmore

[57] ABSTRACT

A motor vehicle having excavating machinery mounted thereon and having at least two axles, at least one of which is driven, and further including an operator cab, the vehicle having counterweights on each lateral side of the cab, guides for the counterweights extending lengthwise of the vehicle on each lateral side of the cab, the counterweights being movable along the guides from a first position above one of the axles to a second position above the other of the axles, and apparatus for selectively securing the counterweights in each of the two positions.

16 Claims, 6 Drawing Figures

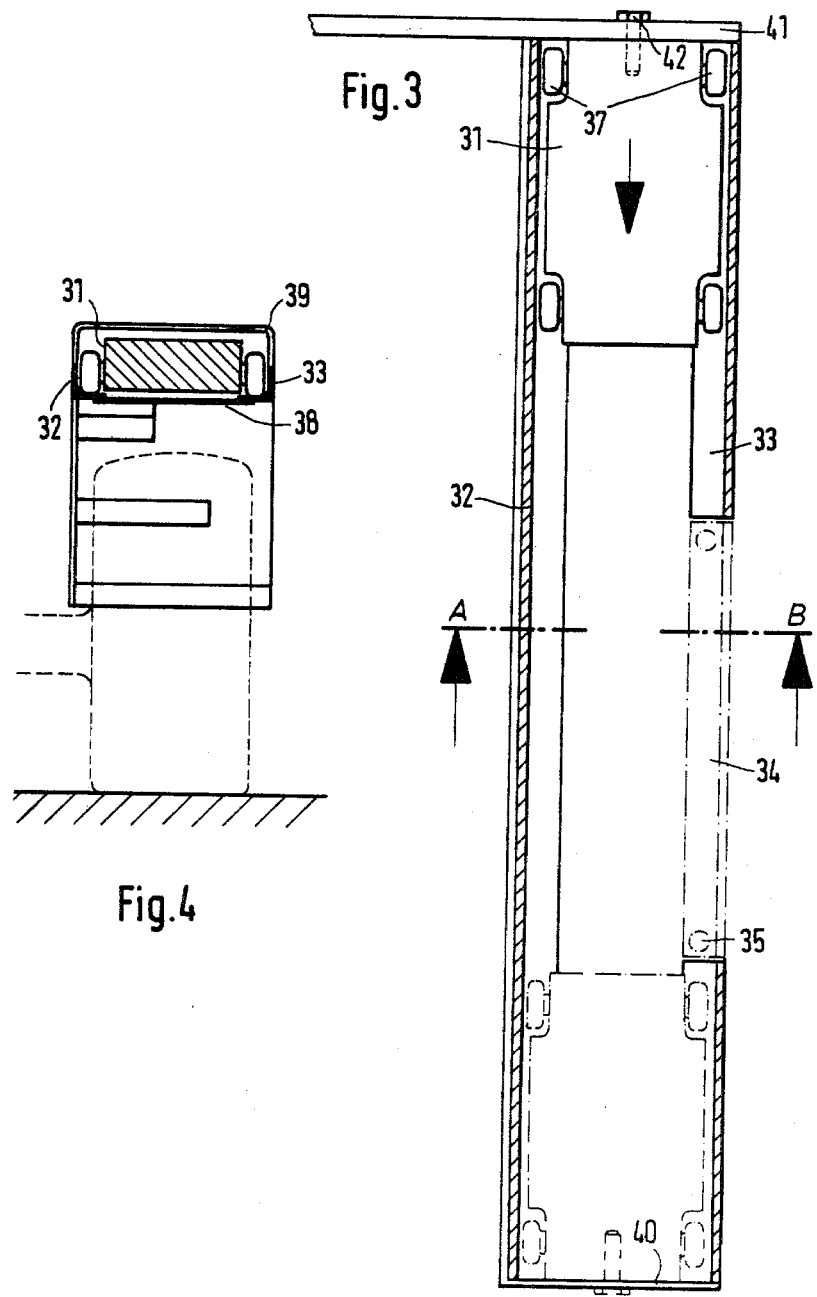

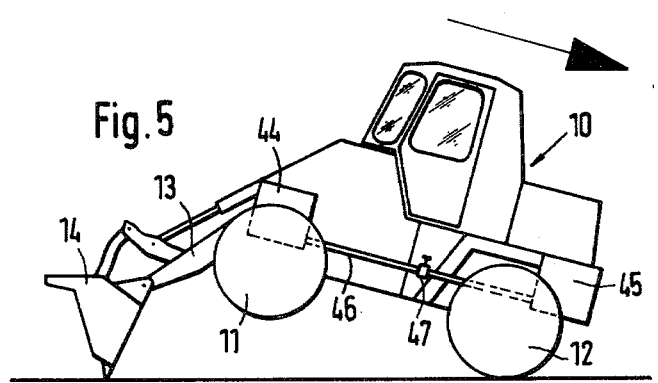
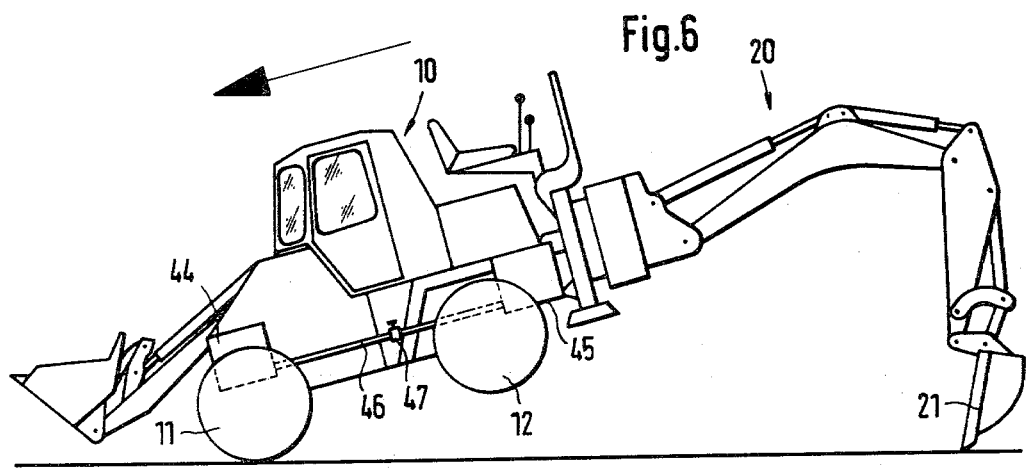

VEHICLE WITH ADJUSTABLE BALANCE WEIGHT

The invention concerns a motor vehicle, in particular a carrying vehicle for fixed or interchangeably mounted machinery, having a balance weight which improves the stability of the vehicle while traveling.

In order to use the shovels of front loaders or other equipment mounted on swinging arms, such that severe limitations do not apply, vehicles of the above described type ordinarily have a rear counterweight. In order to make use of an available carrying vehicle for other purposes in situations where there is little opportunity to use the front loader mounted on it, provision is commonly made such as fixtures provided on the rear part of the carrying vehicle for mounting additional rear-end devices, e.g. supplementary excavators, back hoes, ditch cutters, pile drivers, tampers, etc.

If a supplementary excavator is mounted on the back of a front loader, the counterweight also located on the back is not only a hindrance in mounting but also presents problems in operation, since it adds to the load from the supplementary excavator, and may even raise the front axle.

Furthermore, if the counterweight is removed there is the hazard that the carrying vehicle, carrying the rear-mounted supplementary equipment, will easily tip up at the front during traveling.

A known technique with front loaders is to mount the counterweight removably. When converting, this requires a supplementary piece of operating equipment which approaches the carrying vehicle to remove the counterweight. Otherwise the counterweight must be removed from the front loader at a shop or factory, using a block and tackle, a hoist or a crane.

Generally, problems of this type occur with a carrying vehicle which is provided on both ends with connections for some type of supplementary equipment and which has a removable counterweight on the end opposite the heavier supplementary device or opposite the one requiring greater stabilizing forces, whereby instead of a loading shovel as mentioned above, other front devices can be mounted, such as stackers, milling heads, or tunnel driving devices, and at the opposite end other supplementary devices, or devices which are fixed integrally to the vehicle, can be provided.

The problem underlying the invention is to improve a motor vehicle, particularly a carrying vehicle for industrial equipment, such that when the vehicle is equipped with a supplementary device, the counterweight or other added balance weight can be removed simply and without the need for a supplementary piece of operating equipment.

According to the invention this problem is solved by having at least part of the counterweight shiftable between forward and backward positions by hydraulic or mechanical means, or by tilting or raising the carrying vehicle around one of its wheel axles.

When the invention is employed it is no longer necessary, for example with a front loader, to remove the counterweight needed for front loader operation, prior to attaching a rear-end supplementary device. Rather, the rear-end attachment is mounted and connected to the hydraulic system, whereupon in the case of an excavator the back of the carrying vehicle is tilted around the front wheel axle in a maneuver whereby the excavator shovel is braced against the ground, such that the movable counterweight parts, having first been released from a locked arrangement, are automatically shifted forward toward the front end of the vehicle. The simple manipulation for removing rear counterweights from the rear of the vehicle is not only inherently advantageous, but affords the further benefit that now equipment can be mounted on any mounting location of the vehicle as desired, and the resistance to tipping of the vehicle and device combination is increased. In addition, possible psychological obstacles are removed, because the operator is freed from strenuous or hazardous activities, hence the carrying vehicle will be refitted in response to a need, and thus need, more often.

Further, the movable counterweight parts are not actually removed from the vehicle as in former practice, but remain on it and continue to be employed, to balance the weight of the rear-mounted suplementary device at front-end positions, and to improve stability during operation and traveling. If, after conclusion of the work with the rear-mounted supplementary device, it is sought to resume operation of the front loader, the rear-mounted device is removed and the carrying vehicle is swung around the rear wheel axle and raised at the front, bracing the loading shovel against the ground, so that the counterweights, after being unlocked, are automatically shifted into the predetermined rearward position for operation of the front loader.

In a more general embodiment, the invention may be advantageously used with any desired wheeled or track-mounted vehicle with which one or more driven wheel axles have associated with them traction-increasing balance weights, whereby at least part of the balance weight is shifted hydraulically or mechanically between front and rear positions which are associated with different wheel axis at the time can be loaded, with any type of vehicle, and particularly in climbing hills; and if desired this adjustment may be made also in relation to the distribution of the goods being transported by the vehicle.

The counterweight parts can be movably mounted on both sides of the cab and above the undercarriage, can be movable over the length of the vehicle or over slideways extending over part of the length of the vehicle, and can be secured in end positions defined by detents. Although it is advantageous to support the counterweight parts on the guides on each end with rollers, gliding motion can be availed for shifting the counterweight parts, with the choice of materials with low frictions coefficients for the counterweight parts and/or the guides.

In one advantageous embodiment the guides can each have two angle irons separated by a lateral distance, with the horizontal side of the angle iron forming the roller path for the counterweight and the vertical side being a side boundary for the roller path. Preferably the guides comprise channels which are closed on the sides and bottom, with the bottom horizontal. On their sides they may be designed so as to comprise part of the fenders of the vehicle. When angle irons are used, the space between them may be covered to prevent against fouling of the counterweights and to guard against interference with free slidability.

In order to accommodate the adjustable counterweights on a carrying vehicle without altering the latter, it may be advantageous to interrupt the outer side of the guides over the length of a boarding step at the cab, and bridge the distance with releasable or removable supported rails. In this only the outer angle iron need be interrupted in order to afford unimpeded access to the cab, and the undisturbed inner angle iron or channel—the one closest to the cab—may be used as part of the boarding steps.

If the carrying vehicle is articulated, the guides on both sides must be interrupted between the front and rear articulated parts. Due to the swinging relationship between the front and rear articulated parts, the larger interruption, in the outer longitudinal guide segment, is bridged with a releasable supported guide rail, while the longitudinal guide segment near the cab need only have a relatively small gap with no additional bridging means needed. In the straightened position of the articulated vehicle the counterweight can pass over the gap without difficulty, even though the gap may be fairly wide, since the weight is supported on at least three rollers at any instant, and therefore will not unintentionally stop or have a roller become caught in the gap. Thus, along the same lines, with an articulated vehicle the outer sides of the guides are interrupted in the region of a boarding step and the gap may be bridged with a releasable supported guide rail.

In order to protect the counterweight parts, the rollers, and the guide segments against dirt or weathering, the guides can be covered on top, at least in the neighborhood of the two end positions of the counterweight parts. The cover can be secured at the end positions by any suitable means, e.g. bolts, screws, or cotter pins.

In another embodiment the counterweight parts may comprise a liquid contained in a closed system, which system comprises containers mounted in frontward and rearward areas of the vehicle, at least one closed connecting conduit between the containers, and at least one shutoff valve in the connecting conduit. Although the use of high specific gravity liquids, such as mercury, carries a high price which may be an adverse factor, the proposal in general has the advantage that no guides are needed other than simple connecting conduits, and relatively large capacity containers may be used, and may be disposed in the region of the superstructure of the carrying vehicle, whereby a large weight shift may be accommodated without modifying the outer dimensions of the vehicle. The containers may be located in available spaces at the ends of the vehicle or may extend over the entire breadth of the vehicle. Hydraulic oil could be used as the fluid, as one option, whereby the available operating hydraulic oil pumps will be used to send it to and from one container or the other.

According to another variant of the invention the counterweight parts comprise a pourable powder or granular material, spheres, or pellets, contained in a closed system, which system, comprises containers counted in frontward and rearward areas of the vehicle, at least one closed connecting conduit between the containers, and least one shutoff valve in the connecting conduit. If, for example, small shot is used, the advantages of a material with high specific gravity are combined with the advantages of large containers and convenient connecting conduits.

In the following, example embodiments of the invention are described in more detail, in the context of a front loader, with the aid of the drawings:

FIG. 3 is an enlarged schematic top view of a longitudinal guide for a counterweight part, the guide being mounted on the side area of the carrying vehicle;

FIG. 4 is a vertical schematic cross section through line A—B in FIG. 3;

FIG. 5 is a schematic side view of a front loader according to another embodiment of the invention; and FIG. 6 is a schematic side view of the front loader of FIG. 5, carrying a supplementary back hoe.

Figure 1:
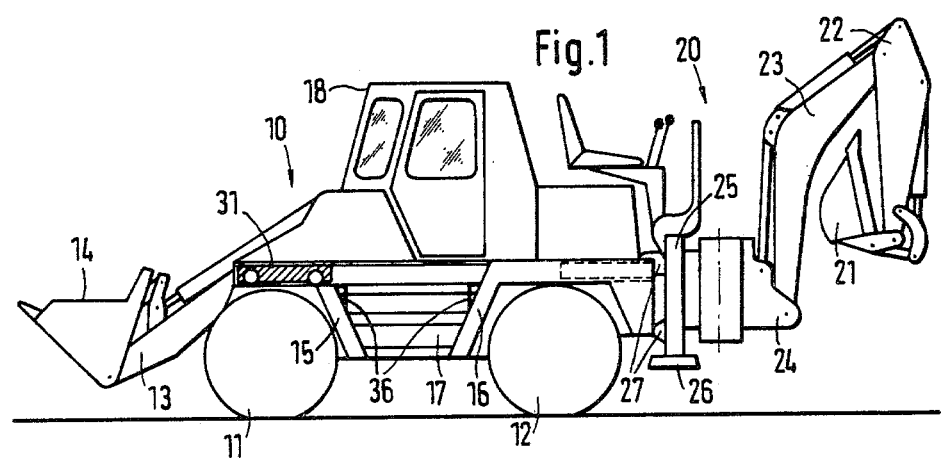
FIG. 1 is a schematic side view of a front loader with a supplementary back hoe attachment.
Figure 2:
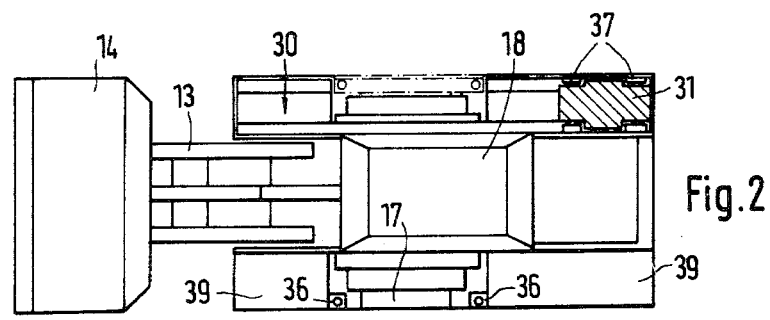
FIG. 2 is a schematic top view, in partial cross section, of the front loader of FIG. 1, with the back hoe removed.

In connection with FIGS. 1 and 2 the carrying vehicle 10 is a front loader supported on front and rear ground wheels 11 and 12, respectively. Forward swing arms 13 with a loading shovel 14 are swingable mounted on the body of the vehicle and are hydraulically movable. Ground wheels 11 and 12 are covered on the sides and top by fenders 15 and 16, between which there is a boarding step 17 to a cab 18.

At the back end of the carrying vehicle 10 there is a supplementary hoe or excavator 20, which is mounted on the carrying vehicle with mounts which are not shown in detail. The supplementary hoe is representative of designs in common use. It basically comprises a trench shovel 21, shovel shaft 22, boom 23, and supporting piece 24 which is swingable around a vertical axis. The pivot means is adjustably attached to a crossrail 25 which has lateral support legs 26 and coupling members 27 directed toward the carrying vehicle 10.

The horizontal segments of fenders 15 and 16 are integrated with longitudinal guides 30 for counterweignts 31, which guides are mounted on both sides of the carrying vehicle. When the front loader is not carrying any supplementary rear-mounted device, as in FIG. 2, the counterweights 31 are in the rear positions on longitudinal guides 30 as shown in dashed lines in FIG. 1. When the front loader is equipped with a supplementary rear-mounted device, as in FIG. 1, the counterweights 31 are located in their front position.

In connection with FIGS. 3 and 4 the guide for counterweight 31 comprises two angle irons 32 and 33 positioned at a lateral distance from each other. Inner angle iron 32 which is next to the superstructure of the carrying vehicle extends continuously over the length of the vehicle. The outer angle iron 33 is interrupted in the region of the boarding steps 17 (see also FIGS. 1 and 2) and can be supplemented with a guide rail 34 when the counterweight is to be moved from the rear position of FIG. 3 to the front position indicated by broken lines. Releasable guide rails 34 are carried along on the vehicle, and when needed they are, for example, inserted into receiving openings of holders 36 (see FIG. 1), making use of vertical pins 35, whereby the holders support the rails. After the shifting of the counterweight 31, guide rails 34 is removed, and boarding steps 17 can be negotiated without hindrance. Counterweight 31 is mounted on rollers 37 on both of its ends, which rollers run along the horizontal side of angle irons 32 and 33. The space between angle irons 32 and 33 is bridged and closed off by a cover 38 (FIG. 4) which forms part of the fender. The channel formed by the two angle irons 32 and 33 and the bottom cover plate 38 (which may alternately be a one piece channel shaped member) is covered with top cover(s) 39, at least in the neighborhood of the end positions of the weight, and the cover(s) extend over the length of the fenders up to boarding steps 17 (in accordance with FIGS. 1 and 2). The front and rear ends of the guide channel thus formed are closed off by vertical plates 40 and 41 which are welded or bolted on and act as end detents. Counterweight 31 is secured through openings in detent plates 40 and 41 by means of screw 42.

During operation of the front loader, counterweights 31 are in their rear positions on guides 30 (FIG. 2). If the carrying vehicle is equipped with a rear-mounted device 20 it is first mounted in customary fashion and connected to the hydraulic system of the carrying vehicle, trench shovel 21 is braced against the ground, and by appropriate swinging of boom 23 and shovel shaft 22 the carrying vehicle is tilted as in FIG. 6. Previous to this the locking means 42 of the counterweight has been released, and the normally open (with a gap) sections of guides 30 have been bridged with guide rails 34. In the tilted position of FIG. 6 the counterweights 31 can roll by gravity into their front end positions, where they then are locked in place as in the rear positions. Going the other way, after the rear-mounted device has been removed the loader shovel 14 is braced against the ground and the carrying vehicle is raised at the front, as in FIG. 5, by working swing arms 13, whereby the counterweights 31 roll to their rear positions where they are again locked in place.

FIGS. 5 and 6 schematically show front and rear containers 44 and 45 which are disposed on both sides of the carrying vehicle and which further may extend over its entire width. The containers are in fluid communication through appropriate conduits 46, suited in cross sectional area and shape to the type of flowable or pourable counterweight material selected for use. There is a shutoff valve 47 in connecting conduits 46 in order to isolate the material once it is shifted to the front or rear by tilting the carrying vehicle. Containers 44 and 45 are shown schematically; clearly their enclosed volume may be increased, for example by extending them downward at an angle, as far as would still permit all the material to empty out freely by flowing or pouring out of the raised containers when the carrying vehicle is tilted.

I claim:

1. A vehicle having means at at least one end thereof for mounting working machinery thereon, said vehicle having at least two axles at least one of which is driven and further including an operator cab, counterweight means on each lateral side of said cab, guide means for said counterweight means extending lengthwise of said vehicle on each lateral side of said cab, said counterweight means being moveable along said guide means from a first position above one of said axles to a second position above the other of said axles, and means for selectively securing said counterweight means in each of said positions.

2. A vehicle as in claim 1 and including means for shifting said counterweight between said positions.

3. A vehicle as in claim 2 and wherein said shifting means includes hydraulic means.

4. A vehicle as in claim 1 and wherein said counterweight means includes rollers mounting said counterweight means on said guide means.

5. A vehicle as in claim 1 or 4 and wherein said counterweight means is mounted on said guide means so that upon tilting said vehicle about one of said axles, said counterweight means may move to the position over said one of said axles by gravity upon releasing said securing means.

6. A vehicle as in claim 4 and wherein said guide means comprises longitudinally extending laterally spaced angle members forming tracks for said rollers.

7. A vehicle as in claim 6 including a removable portion in the laterally outermost of each of said guide means angle members and the laterally innermost of each of said guide means angle members comprising a pair of longitudinally aligned angle segments having a gap between the juxtaposed ends thereof.

8. A vehicle as in claim 1 and wherein said guide means comprises a channel member closed on the sides and the bottom thereof, said channel member forming a portion of the fender of said vehicle.

9. A vehicle as in claim 1, 6, or 8 and wherein said guide means includes a removable portion adjacent said cab for facilitating operator access to said cab.

10. A vehicle as in claim 1 and including means covering said guide means at least at each of said positions.

11. A vehicle as in claim 1 and including end detents for limiting the extent of travel of said counterweight means and wherein said securing means connects said counterweight means to said detents.

12. A vehicle as in claim 1 wherein said counterweight means comprises a fluid and said guide means comprises receptacle means at each of said positions, a conduit connecting said receptacle means, and a shutoff valve in said conduit.

13. A vehicle as in claim 12 and wherein said receptacle means comprises a pair of front receptacles and a pair of rear receptacles and conduits connecting front and rear receptacles on each side of the vehicle.

14. A vehicle as in claim 13 and wherein said receptacles includes vent openings.

15. A vehicle as in claim 14 and wherein said fluid is hydraulic oil and said conduits are connected to a hydraulic system on said vehicle.

16. A vehicle as in claim 12 and wherein said fluid is a pourable powder or granular material.

* * * * *